United States Patent [19]

Degelman

[11] Patent Number: 4,555,897
[45] Date of Patent: Dec. 3, 1985

[54] TRANSPORTABLE WIDE SWATH TRAILING IMPLEMENT

[75] Inventor: Wilfred J. Degelman, Regina, Canada

[73] Assignee: Degelman Industries Ltd., Regina, Canada

[21] Appl. No.: 593,809

[22] Filed: Mar. 27, 1984

[30] Foreign Application Priority Data

Jan. 13, 1984 [CA] Canada ................................. 445265

[51] Int. Cl.$^4$ .............................................. A01B 73/00
[52] U.S. Cl. ....................................... 56/228; 171/65; 172/240; 172/386
[58] Field of Search ................ 56/228, 14.9, 376, 377, 56/DIG. 21; 171/63, 65; 172/625, 240, 241, 244, 324, 386, 383, 248; 280/415 R, 462, 463, 656

[56] References Cited

U.S. PATENT DOCUMENTS

| | | | |
|---|---|---|---|
| 2,873,126 | 2/1959 | Van Der Lely et al. | 280/462 |
| 3,893,283 | 7/1975 | Dandl | 56/228 |
| 4,040,490 | 8/1977 | Anderson | 171/63 |
| 4,166,353 | 9/1979 | Garrison et al. | 56/377 |
| 4,206,816 | 6/1980 | Viel | 171/63 |
| 4,324,093 | 4/1982 | Van Der Lely et al. | 56/377 |

FOREIGN PATENT DOCUMENTS

| | | | |
|---|---|---|---|
| 668336 | 8/1963 | Canada | |
| 695388 | 10/1964 | Canada | |
| 711441 | 6/1965 | Canada | |
| 1048791 | 2/1979 | Canada | |
| 96582 | 7/1963 | Netherlands | 56/377 |

Primary Examiner—Gene Mancene
Assistant Examiner—John G. Weiss
Attorney, Agent, or Firm—Barrigar & Oyen

[57] ABSTRACT

A transportable trailing wide-swath wheel-supported implement such as a rock windrower is conveniently able to convert from wide-swath working mode to a transversely narrower folded mode for convenient transport of the implement. The folding elements are a drawbar and the wheel legs, each of these being pivotally attached to the implement frame about a substantially vertical pivotal axis. In working mode, the wheel legs and drawbar are extended at a relatively large acute angle or right angle to the frame whereas in transport mode they pivotally retract to assume relatively small acute angles to the frame. The wheel legs may be locked in either extended or retracted position. Between the drawbar and the frame is preferably pivotally connected a hydraulic piston-cylinder arrangement, permitting the angle of the drawbar to the frame to be adjusted and controlled. If the implement is of the type having a working element in ground engaging contact, means such as an additional hydraulic piston-cylinder arrangement are preferably provided to enable the working implement to be pressed against the ground and to remove the weight from the implement-supporting wheels, the wheel legs rising above the ground permitting the wheels to clear the ground thereby facilitating their repositioning about the pivotal axis of connection to the frame.

14 Claims, 5 Drawing Figures

TRANSPORTABLE WIDE SWATH TRAILING IMPLEMENT

FIELD OF THE INVENTION

This invention relates to a transportable trailing wide-swath wheel-supported implement capable of being folded from a working wide-swath mode to a relatively narrow transport mode, by means of pivotal retraction of drawbar and support wheel legs.

RELATED PATENT

A rock windrower constructed in accordance with the present invention constitutes an improvement, as to transportability, of the rock windrower described in Canadian Pat. No. 1,048,791, Wilfred J. Degelman, granted Feb. 20, 1979.

REVIEW OF THE PRIOR ART

The applicant invented a rock windrower, sometimes referred to as a rock rake, which is described in the above-mentioned Canadian Pat. No. 1,048,791 and which was described and illustrated in the patent as comprising a substantially triangular frame on which was mounted a transverse wide-swath rock windrower comprising a working windrower drum pivotally mounted on a rocker shaft support beam. The rocker shaft support beam functioned in effect as a transverse wide-swath frame for the working elements. This particular rock windrower had limited capability for reduction of the effective transverse width in transport mode. It will be appreciated that it is desirable that the width of any wide-swath trailing implement such as a rock windrower normally pulled by a tractor or the like be reduced when the implement is being transported from point to point along a highway, because the normal wide swath of the implement may exceed the lane width of the highway or have difficulty negotiating narrow bridges, and thus present a potential obstruction and hazard to other traffic.

Various solutions have been devised to the problem of reducing the effective transverse width of a wide-swath trailing implement in transport mode. Some wide-swath implements are provided with a central wide-swath frame portion and two or more side wing wide-swath frame portions which fold upwardly and inwardly about horizontal axes toward the center wide-swath frame portion, thereby to occupy an effective transverse width equal only to that of the central frame portion of the implement. In other cases the implement may be provided with a separate set of transport mode wheels oriented at approximately right angles to the support wheels for the implement in working mode, and which are extended downwardly as the working support wheels retract thereby to permit the implement to be drawn by the tractor in a direction normal to the direction of travel of the implement when it is operating in working mode. Such solutions as the foregoing are not suitable for all types of trailing wide-swath implements. Some generate an additional expense, such as the expense of having a separate set of transport mode support wheels and associated hydraulics. In the case of a rock windrower, it is highly desirable that the rock raking drum be formed as a single unit incapable of folding, and this eliminates one potential solution to the transport problem that might otherwise be available, namely the use of side wings which fold upwardly and inwardly towards the center.

SUMMARY OF THE INVENTION

The applicant has found that a fairly simple solution to the transport problem in a wide-swath trailing implement such as a rock windrower can be provided by having the support wheels located on wheels legs which are pivotally mounted on the wide-swath frame about substantially vertical pivotal axes, and by having the drawbar similarly vertically pivotally attached to the wide-swath frame (i.e. the drawbar swings through a more or less horizontal arc). In working position of the implement, the wheel legs extend generally rearwardly at a relatively large acute angle or a right angle to the wide-swath frame, while the drawbar extends forwardly from the wide-swath frame at a similar large acute angle or right angle. To convert the implement to transport mode, the wheel legs are pivotally retracted inwardly towards the wide-swath frame and the drawbar is likewise pivotally retracted inwardly towards the wide-swath frame, thereby permitting the effective transverse width of the implement in transport mode to be substantially narrower than it is in the case of the wide-swath working mode of operation. In transport mode, it may be convenient to have one of the wheel legs pivot through an angle of the order of 180° or more to adopt a generally forward extension and to have the other of the wheel legs adopt a generally rearward extension both in working mode and transport mode. Preferably, locking means are provided to lock the wheel legs either in extended position or retracted position. There may be more than one preferred extended position (so that the implement frame may assume more than one angle to the direction of travel when operating in working mode) and a locking position may be provided for each such extended position. A hydraulic piston-cylinder arrangement is preferably connected between the wide-swath frame and the drawbar by substantially vertical pivotal connections so that, by controlling the hydraulic piston-cylinder arrangement, one can vary the angle between the wide-swath frame and the drawbar over a suitable range of operating angles of the implement. The locking means for the wheel legs may conveniently be provided by having one locking element on each wheel leg and a plurality of other locking elements (for retracted position and a plurality of extended positions) on pivot plates fixed to the wide-swath frame and each being located immediately adjacent that portion of its associated wheel leg that lies proximate to the connection point of the wheel leg to the frame.

While a preferred embodiment of the invention will be described with reference to two support wheels and associated wheels legs, it is apparent that additional support wheels and wheel legs could be provided as desired. Conveniently the two wheel legs are located on opposite sides of the wide-swath frame. One of the wheel legs is located relatively close to one end of the wide-swath frame and may conveniently pivot through an angle of the order of 180° or more to move from operating mode to transport mode. The other wheel leg can move from a relatively large to a relatively small acute angle but maintain a generally rearward orientation.

If the wide-swath implement is of the type having a working element or a plurality of working elements close to or engaging the ground when in operation, it may be possible through a suitable hydraulic arrangement or the like to force the working element downwardly into the ground relative to the wide-swath frame thereby to assume the weight of the implement and to lift the wheel legs upwardly sufficient to permit the support wheels to clear the ground. The wheel legs can then be pivoted from one locking position to another and locked in place with a minimum of effort.

All of the drawings are somewhat schematic in character to simplify the description.

DETAILED DESCRIPTION WITH REFERENCE TO THE DRAWINGS

The present invention is described and illustrated with reference to a rock windrower. However the principles of the invention could be utilized in association with a wide variety of trailing wide-swath implements intended to be pulled by a tractor or the like. The governing principle is that the wide-swath frame and associated working elements should, when the frame and working elements are shifted into transport mode, occupy a sufficiently narrow effective transverse space that the pivotal retraction of the wheel legs and drawbar should permit the implement to be transported with an overall transverse dimension smaller than the wide-swath dimension when the implement is in working mode.

Not all of the features to be described with reference to the rock windrower will necessarily have application to other types of trailing wide-swath implement. For example, the hydraulics and pivotal attachment of the raking drum to the wide-swath frame in a rock windrower make possible an extreme position of the drum relative to the wide-swath frame which permits the drum to engage the ground and to lift the wheel legs upwardly relative to the ground so that the wheels can clear the ground. This facilitates the pivoting of the wheel legs from extended working position to retracted transport position and vice versa. However this kind of operation might have to be replaced or modified for some other types of wide-swath implement-e.g. rototillers, land levellers, or sprayers.

It is also desirable in connection with the rock windrower and some other types of implement to vary the angle of inclination of the drawbar relative to the wide-swath frame. This is either not desired or not necessary for certain other types of implement. The reader should bear this in mind when reading the detailed description of the rock windrower to be described as a preferred embodiment of the invention.

Figure 1:
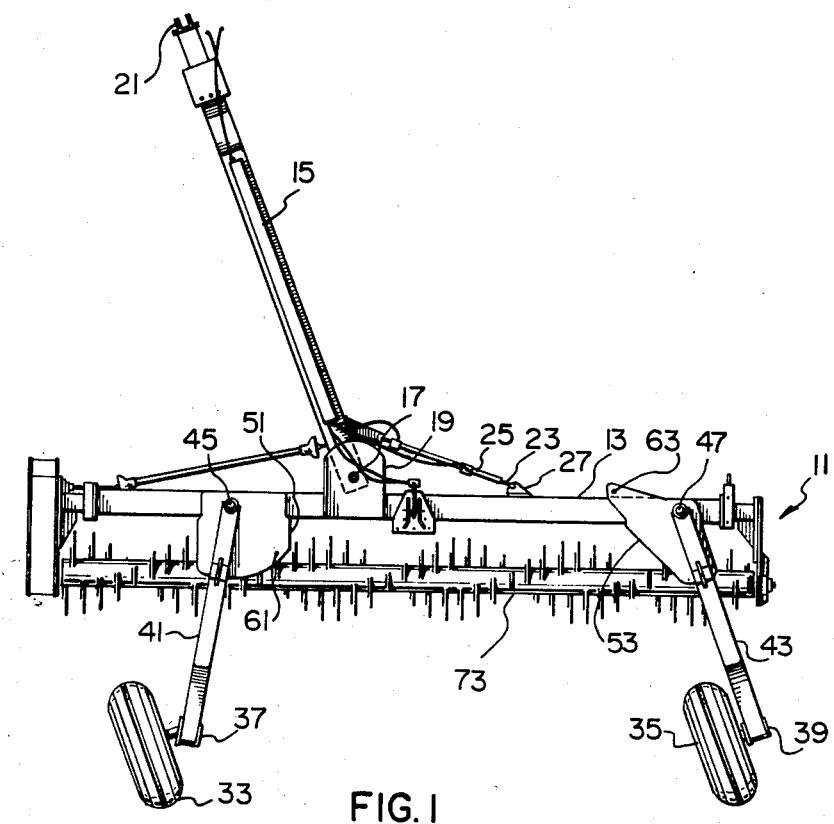
FIG. 1 is a plan view of a rock windrower constructed in accordance with the principles of the present invention, shown in working mode.

Turning now to FIG. 1, a rock windrower generally indicated as 11 is provided with a wide-swath frame 13, which may simply be a length of relatively strong steel pipe. A drawbar 15 is pivotally connected by vertical pole pin 17 to clevis plates 19 fixed to the wide-swath frame 13, thereby to afford a pivotal connection of drawbar 15 relative to frame 13 about a generally vertical pivotal axis passing through pole pin 17. The free end 21 of drawbar 15 is adapted for connection to a pulling vehicle such as a tractor (not shown).

One end 23 of hydraulic piston-cylinder assembly 25 is pivotally attached to mounting bracket 27 fixed to frame 13. The other end 29 of the piston-cylinder unit 25 is pivotally attached to mounting bracket 31 fixed to drawbar 15. This arrangement permits the angle of drawbar 15 relative to frame 13 to be adjusted and controlled. Alternative adjustment devices could be used instead of a piston-cylinder arrangement - for example, a slide bar with a series of spaced holes engaging a bracket by means of a removable connecting bolt and nut could be used instead. In FIG. 1 the angle is suitable for working mode; the angle could be chosen to be approximately 90° or, as shown, about 20° off the 90° mark, or an even smaller acute angle. (Note that drawbar 15 makes with frame 13 two angles, one of which is necessarily acute and one of which is necessarily obtuse unless the angle is exactly 90°. For the purposes of discussion, we shall ignore the obtuse angle and simply note that in working position, the drawbar 15 makes an angle of either 90° or a relatively large acute angle to the frame 13.)

Figure 3:
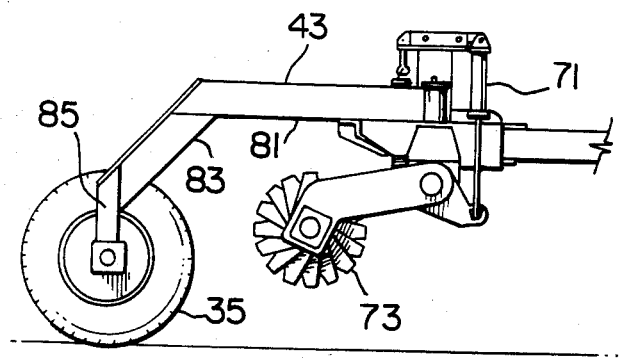
FIG. 3 is a side elevation view of the windrower of FIG. 1, showing the windrower with its operating drum fully retracted above the ground.
Figure 4:
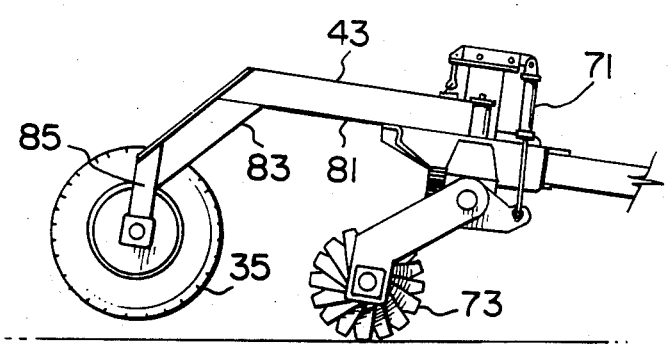
FIG. 4 is a side elevation view of the windrower of FIG. 1, showing the operating drum forced into its lowermost position relative to the frame, the wheel legs in that position having been moved upwardly so that the wheels are no longer in ground-engaging position.

The rock windrower 11 is supported above the ground by the towing vehicle (not shown) via the hitching arrangement at end 21 of drawbar 15, and by a pair of support wheels 33 and 35. Each of the support wheels is rotatably mounted in respective bearing supports 37, 39 located at the free ends of associated wheel legs 41, 43. The wheel legs 41, 43 are pivotally mounted by pole pins 45, 47 respectively to frame 13 and are free to pivot (within limits and when not locked) about vertical pivotal axes passing respectively through pole pin 45 and pole pin 47. As can best be seen in FIGS. 3 and 4, each wheel leg comprises a generally horizontal portion 81 nearest the associated pole pin, a downwardly inclined portion 83, and a lowermost generally vertical portion 85 to which is connected the wheel bearing support. This construction enables the wheel legs when pivoted between the retracted and extended positions of the wheel legs to clear without obstruction the working elements of the windrower (to be described in further detail below).

Figure 2:
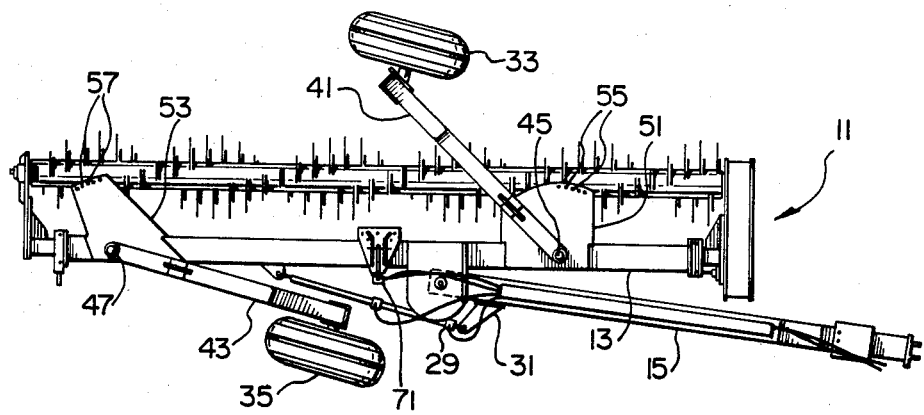
FIG. 2 is a plan view of the windrower of FIG. 1, shown in transport mode.

In FIG. 1, wheel legs 41 and 43 are shown in extended working position at relatively large acute angles to the frame 13. In FIG. 2 the wheel legs are shown in retracted transport position at relatively small acute angles to the frame 13. Drawbar 15 has equally been moved from its extended working position in FIG. 1 to its retracted transport position in FIG. 2, thereby reducing the acute angle between the drawbar 15 and the frame 13 as the drawbar 15 moves from extended to retracted position.

Note that in FIG. 1, both wheels legs 41 and 43 extend generally rearwardly relative to the direction of travel of the implement. In FIG. 2, wheel leg 41 remains generally rearwardly oriented but wheel leg 43 has been swung around from its extended rearward orientation to a forward orientation through an angle of greater than 180°.

Since pole pin 17 connecting drawbar 15 to frame 13 is located generally transversely centrally of the frame 13 and since pole pins 45 and 47 are on opposite sides of frame 13 from one another, it can be seen, viewing FIG. 2, that the geometry chosen permits the two wheels 33, 35, which are approximately but not exactly coaxial in working mode, to remain approximately coaxial in transport mode, thereby lending stability to the implement while it is being transported. This result is facilitated by having the pole pin 45 located closer to the center of the frame 13 than the pole pin 47. There are of course other ways of producing this preferred geometry; for example, one of the wheel legs could be made appreciably longer than the other of the wheel legs, or the like. The wheel 33 moves inwardly in transport mode to reduce the overall distance between wheels 33 and 35, thereby tending to maintain the trim narrow transverse dimension when the implement is being towed in transport mode. Note that having pole pin 45 located relatively close to the center of frame 13 rather than at an extreme end of the frame 13 facilitates a narrow transverse width in transport mode.

Figure 5:
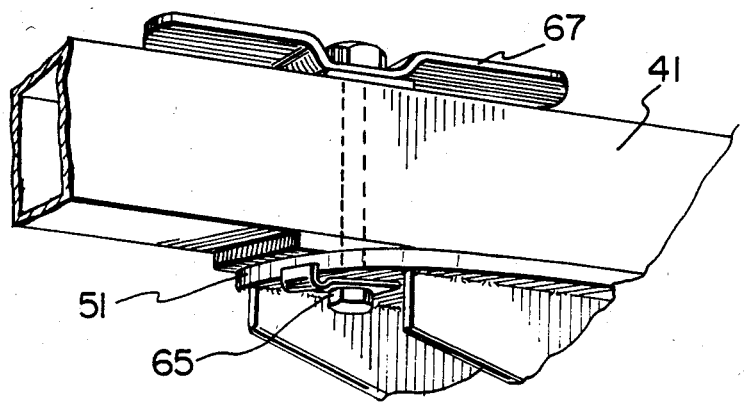
FIG. 5 is a detail view of the locking means for the wheel legs of the rock windrower of FIG. 1.

Mounted on frame 13 are a pair of pivot plates 51, 53 each associated with a respective wheel leg 41, 43. These pivot plates 51, 53, generally horizontal in orientation, are provided with a plurality of working mode locking holes 55, 57 respectively and transport mode locking holes 61, 63 respectively. As shown in FIG. 5, each wheel leg has a corresponding mating locking hole through which a bolt 65 extends to lock, when mating wing nut 67 is tightened onto the bolt 65, the wheel leg 41 in a preferred one of the available locking holes in its associated pivot plate 51. The multiplicity of working mode locking holes are provided in the two pivot plates 51, 53 to enable the wheel legs to be set at the preferred angle of orientation relative to frame 13, thereby to accommodate a preferred angle of orientation of frame 13 relative to drawbar 15.

The other elements of the rock windrower may be constructed substantially as described and illustrated in applicant's aforementioned Canadian Pat. No. 1,048,791 and consequently need not be described further in detail herein.

In the aforementioned Canadian Pat. No. 1,048,791 it is disclosed that by varying the extension of hydraulic piston-cylinder assembly 71, it is possible to control the relative elevation of the drum 73 relative to wide-swath frame 13, and specifically it is possible to force the drum 73 downwardly relative to the wide-swath frame 13. If hydraulic assembly 71 is appropriately chosen and the geometry of drum 73 relative to frame 13 suitably selected, it is possible in an extreme position of the hydraulic piston-cylinder assembly 71 to cause frame 13 to be elevated whilst drum 73 maintains ground-engaging contact thereby to lift wheel legs 41 and 43 sufficiently that wheels 33 and 35 clear the ground (see FIG. 4). This enables the wheel legs 41 and 43 to be unlocked and pivoted easily from one locking position to another - i.e. from one selected working position to transport position, from transport position to a selected working position, or from one selected working position to another selected working position. All that is required is that the wing nut 65 be removed from bolt 63, the bolt 63 removed from engagement with its mating holes in the wheel leg and associated pivot plate, the wheel leg then swung into the new desired position, the bolt 63 reinserted and the wing nut 65 reattached thereto.

Other modifications to suit individual applications will occur to those skilled in the art. The scope of the invention is as defined in the accompanying claims.

I claim:

1. A transportable trailing wide-swath wheel-supported implement comprising
    a wide-swath frame for supporting at least one working element;
    a drawbar pivotally connected to the frame about a substantially vertical pivotal axis;
    at least two wheel legs each having an inner end pivotally mounted on the frame about a substantially vertical pivotal axis; and
    an implement-supporting wheel mounted for rotation about a substantially transverse horizontal axis on the outer end of each of said wheel legs;
    the wheel legs and drawbar each being pivotally movable to assume selectably a retracted position at a relatively small acute angle to the swath dimension of the frame and an extended position at a relatively large acute angle or right angle to the swath dimension of the frame, thereby permitting the effective transverse width of the implement to vary between a relatively small transport mode dimension in the retracted position of said drawbar and wheel legs and a relatively large working mode dimension in the extended position of said drawbar and wheel legs;
    wherein the pivotal connection to the frame of one of said wheel legs is located on the side of the frame opposite that on which the pivotal connection of another of said wheel legs is located, and the pivotal connection for the drawbar is located generally centrally along the frame between the locations of the pivotal connections of the wheel legs, and wherein the wheel legs in extended position extend generally rearwardly of the frame whilst the drawbar in extended position extends generally forwardly of the frame; and
    wherein one of the wheel legs swings generally inwardly through an angle less than a right angle to move from extended to retracted position whilst the other of the wheel legs swings from rearward to generally forward orientation through an angle of the order of 180° or more to move from extended to retracted position.

2. An implement as defined in claim 1, wherein the first-mentioned wheel leg is pivotally connected to the frame closer to the transverse center thereof than the pivotal connection of the second-mentioned wheel leg.

3. An implement as defined in claim 1, wherein the wheel legs are of identical or similar lengths, and the locations of their associated pivotal axes are chosen so that in transport mode, the associated wheels are approximately coaxial.

4. An implement as defined in claim 2, wherein the wheel legs are of identical or similar lengths, the locations of their associated pivotal axes are chosen so that in transport mode, the associated wheels are approximately coaxial, and the wheel of the first-mentioned wheel leg is mounted at an obtuse angle thereto.

5. An implement as defined in claim 1 additionally comprising means for locking the wheel legs selectably in retracted position and extended position.

6. An implement as defined in claim 1 additionally comprising a hydraulic cylinder-piston unit pivotally connected about substantially vertical pivotal axes between the drawbar and the frame, thereby affording selection and control of the angle between the drawbar and the frame.

7. An implement as defined in claim 1 additionally comprising means for selectably moving the vertical position of the working elements relative to the frame and in an extreme position thereof forcing the working elements into ground engagement and lifting the frame relative to the ground whereby the wheels move upwardly out of contact with the ground, thereby facilitating pivotal movement of the wheel legs.

8. An implement as defined in claim 1 additionally comprising means for selectably moving the vertical position of the working elements relative to the frame and in an extreme position thereof forcing the working elements into ground engagement and lifting the frame relative to the ground whereby the wheels move upwardly out of contact with the ground, thereby facilitating pivotal movement of the wheel legs, and means for locking the wheel legs selectively in retracted position and extended position.

9. An implement as defined in claim 1 additionally comprising means for selectably moving the vertical position of the working elements relative to the frame and in an extreme position thereof forcing the working elements into ground engagement and lifting the frame relative to the ground whereby the wheels move upwardly out of contact with the ground, thereby facilitating pivotal movement of the wheel legs, means for locking the wheel legs selectably in retracted position and extended position, and means for adjusting the angle between the drawbar and the frame.

10. An implement as defined in claim 1 additionally comprising means for selectably moving the vertical position of the working elements relative to the frame and in an extreme position thereof forcing the working elements into ground engagement and lifting the frame relative to the ground whereby the wheels move upwardly out of contact with the ground, thereby facilitating pivotal movement of the wheel legs, and means for locking the wheel legs selectably in retracted position and extended position, and a hydraulic cylinder-piston unit pivotally connected about substantially vertical pivotal axes between the drawbar and the frame, thereby affording selection and control of the angle between the drawbar and the frame.

11. An implement as defined in claim 8 additionally comprising, for each wheel leg, a generally horizontal wheel leg pivot plate fixed to the frame immediately adjacent a portion of the wheel leg both in extended and retracted positions thereof, said wheel leg locking means for extended and retracted positions thereof, said wheel leg locking means for extended and retracted positions of each said wheel leg comprising at least one locking element located on the associated wheel leg pivot plate.

12. An implement as defined in claim 1, said implement being a rock windrower.

13. An implement as defined in claim 1, wherein each wheel leg comprises a generally horizontal portion proximate to the pivotal connection thereof to the wide-swath frame and a downwardly dependent portion near the end of which the associated wheel is mounted.

14. An implement as defined in claim 1, wherein the wheel of the first-mentioned wheel leg is mounted at an obtuse angle thereto.

* * * * *